US011598495B2

(12) United States Patent
Piermatteo et al.

(10) Patent No.: US 11,598,495 B2
(45) Date of Patent: Mar. 7, 2023

(54) LED LIGHTING ELEMENTS COMPRISING MOLDED PARTS MADE OF TRANSLUCENT POLYCARBONATE COMPOSITIONS HAVING A DEEP GLOSS EFFECT

(71) Applicant: Covestro Deutschland AG, Leverkusen (DE)

(72) Inventors: Ciro Piermatteo, Leverkusen (DE); Armin Berger, Langenfeld (DE); Gianmaria Malvestiti, Capriate San Gervasio (IT); Vincenzo Taravella, Curno (IT)

(73) Assignee: Covestro Deutschland AG, Leverkusen (DE)

( * ) Notice: Subject to any disclaimer, the term of this patent is extended or adjusted under 35 U.S.C. 154(b) by 290 days.

(21) Appl. No.: 16/633,056

(22) PCT Filed: Jul. 19, 2018

(86) PCT No.: PCT/EP2018/069582
§ 371 (c)(1),
(2) Date: Jan. 22, 2020

(87) PCT Pub. No.: WO2019/020478
PCT Pub. Date: Jan. 31, 2019

(65) Prior Publication Data
US 2020/0173616 A1    Jun. 4, 2020

(30) Foreign Application Priority Data

Jul. 24, 2017   (EP) .................................... 17425079

(51) Int. Cl.
*F21K 9/66* (2016.01)
*F21V 3/06* (2018.01)
*C08K 5/00* (2006.01)
*C08K 3/04* (2006.01)
*C09B 1/32* (2006.01)
*C08L 69/00* (2006.01)
*C09B 5/14* (2006.01)
*C08K 3/22* (2006.01)

(52) U.S. Cl.
CPC ................ *F21K 9/66* (2016.08); *C08K 3/04* (2013.01); *C08K 5/0041* (2013.01); *C08L 69/00* (2013.01); *C09B 1/32* (2013.01); *C09B 5/14* (2013.01); *F21V 3/062* (2018.02); *C08K 2003/2241* (2013.01)

(58) Field of Classification Search
None
See application file for complete search history.

(56) References Cited

U.S. PATENT DOCUMENTS

| 2,991,273 A | 7/1961 | Hechelhammer et al. |
| 2,999,835 A | 9/1961 | Goldberg |
| 2,999,846 A | 9/1961 | Schnell et al. |
| 3,148,172 A | 9/1964 | Fox |
| 3,271,367 A | 9/1966 | Schnell et al. |
| 3,879,348 A | 4/1975 | Serini et al. |
| 4,101,513 A | 7/1978 | Fox et al. |
| 4,185,009 A | 1/1980 | Idel et al. |
| 4,395,463 A | 7/1983 | Kray |
| 4,982,014 A | 1/1991 | Freitag et al. |
| 5,041,313 A | 8/1991 | Patel |
| 5,235,026 A | 8/1993 | Wulff et al. |
| 5,288,778 A | 2/1994 | Schmitter et al. |
| 5,367,044 A | 11/1994 | Rosenquist |
| 5,391,795 A | 2/1995 | Pickett |
| 5,821,380 A | 10/1998 | Holderbaum et al. |
| 5,869,185 A | 2/1999 | Bahr et al. |
| 5,883,165 A | 3/1999 | Kröhnke et al. |
| 6,228,973 B1 | 5/2001 | McCloskey et al. |
| 6,350,512 B1 | 2/2002 | Hurley et al. |
| 6,613,869 B1 | 9/2003 | Horn et al. |
| 7,442,430 B2 | 10/2008 | Buckel et al. |
| 2006/0155005 A1* | 7/2006 | Kondo ................. C09D 11/101 523/160 |
| 2007/0044907 A1* | 3/2007 | Hatase ............... B29C 65/1635 156/272.8 |
| 2008/0014376 A1 | 1/2008 | Horio et al. |
| 2011/0207846 A1 | 8/2011 | Monden |
| 2012/0157586 A1* | 6/2012 | Dern .................... C08K 5/3465 524/88 |
| 2014/0221541 A1* | 8/2014 | Tajima ................... C08L 83/04 524/165 |
| 2014/0322509 A1 | 10/2014 | Meyer et al. |
| 2014/0370213 A1 | 12/2014 | van der Mee et al. |

FOREIGN PATENT DOCUMENTS

| DE | 1031512 B | 6/1958 |
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 2500092 A1 | 7/1976 |
| DE | 2804283 A1 | 8/1978 |
| DE | 3121385 A1 | 8/1982 |
| DE | 3832396 A1 | 2/1990 |
| DE | 4240313 A1 | 6/1994 |

(Continued)

OTHER PUBLICATIONS

International Search Report for PCT/EP2018/069582 dated Nov. 7, 2018.
Written Opinion of the International Searching Authority for PCT/EP2018/069582 dated Nov. 7, 2018.

*Primary Examiner* — Robert T Butcher
(74) *Attorney, Agent, or Firm* — The Webb Law Firm

(57) ABSTRACT

The present invention relates to LED lighting elements comprising translucent mouldings composed of polycarbonate-based moulding compounds, comprising a colourant mixture, carbon black, scattering additive and optionally white pigment, as used, for example, as covers with a day/night design. Through combination with one or more RGB-LEDs, it is possible to achieve surprising colour effects in night design with presence of a deep gloss effect in mouldings that are black and grey in day design.

8 Claims, No Drawings

(56) References Cited

FOREIGN PATENT DOCUMENTS

| | | |
|---|---|---|
| DE | 19943642 A1 | 3/2001 |
| EP | 0500496 A1 | 8/1992 |
| EP | 0517044 A2 | 12/1992 |
| EP | 0570165 A2 | 11/1993 |
| EP | 0634445 A1 | 1/1995 |
| EP | 0839623 A1 | 5/1998 |
| EP | 1308084 A1 | 5/2003 |
| EP | 1506249 A1 | 2/2005 |
| FR | 1561518 A | 3/1969 |
| GB | 1122003 A | 7/1968 |
| GB | 1229482 A | 4/1971 |
| GB | 1367790 A | 9/1974 |
| WO | WO-96015102 A2 | 5/1996 |
| WO | WO-03095521 A1 | 11/2003 |
| WO | WO-2006108520 A1 | 10/2006 |
| WO | WO-2008071363 A2 | 6/2008 |
| WO | WO-2008109072 A1 | 9/2008 |
| WO | WO-2013079477 A1 | 6/2013 |

\* cited by examiner

LED LIGHTING ELEMENTS COMPRISING MOLDED PARTS MADE OF TRANSLUCENT POLYCARBONATE COMPOSITIONS HAVING A DEEP GLOSS EFFECT

CROSS-REFERENCE TO RELATED APPLICATIONS

This application is a national stage application (under 35 U.S.C. § 371) of PCT/EP2018/069582, filed Jul. 19, 2018, which claims benefit of European Application No. 17425079.5, filed Jul. 24, 20174, both of which are incorporated herein by reference in their entirety.

The present invention relates to LED lighting elements comprising mouldings and one or more LEDs in order to shine through the mouldings with LED light, especially with RGB-LED light, wherein the mouldings have been produced from translucent moulding compounds based on aromatic polycarbonate. The LED lighting units serve to implement a day/night design.

As compared with conventional means of lighting such as incandescent lamps or fluorescent lamps, LEDs have different emission characteristics. For applications which require steering of the beam of light, it is often necessary to use lenses or optical fibres. Alternatively or additionally, lighting means comprising LED as light source generally comprise a transparent or translucent housing part which serves to cover the light source, protects the light source and shields it from outside influences such as soil and dust.

Owing to their long lifetime, their low energy consumption and the good light yield, LEDs are finding increasing use as illumination sources, for example in the automotive industry, aviation, interior lighting, facade configuration, etc.

Owing to their pure efficiency with regard to emission of light and high evolution of heat, and also their short lifetime, incandescent lamps are disadvantageous. Energy-saving lamps and much more energy-efficient, but constitute a high level of environmental pollution owing to heavy metal components, especially mercury, and have to be disposed of as special waste. Alternative concepts to conventional lighting sources and modules, for example incandescent lamps or energy-saving lamps, are being sought with regard to sustainability and energy efficiency.

An alternative lighting source that does not have these disadvantages and additionally has a long lifetime and high energy efficiency is offered by semiconductor technology (in the form of an LED, OLED or electroluminescent film). A preferred use of semiconductor technology as a light source is that of the LEDs.

LEDs emit light having a wavelength dependent on the semiconductor material and doping, and so it is possible with LEDs to produce nearly monochromatic light, even in the infrared region or UV region.

There are RGB-LEDs which emit red, green or blue light. For white LED light, light of different wavelengths has to be combined. This is typically achieved by combination of a blue-emitting, a red-emitting and a green-emitting LED to give what are called RGB (red-green-blue) modules, the combined light from which can be perceived as white, or by luminescence techniques in which all or some of the LED radiation is converted by means of phosphors, for example, to different wavelengths.

For instance, white light can be created proceeding from an LED that emits in the blue in the visible region, by addition of a single phosphor that converts some of the radiation in the blue region into red/yellow light. This form of creation of white light is preferred for commercial applications for reasons of cost and owing to the high efficiency of blue LEDs.

Alternatively, it is possible to create white light from UV light created with LEDs with the aid of three different phosphors that emit wavelengths corresponding to an RGB module. If this technique is employed, preference is given to compositions which also have elevated stability to UV radiation, i.e. have been provided, for example, with UV stabilization.

For various applications, especially in the automotive sector, a high-quality day/night design with deep gloss of individual elements, for example of decorative elements or covers in the automotive interior sector, is required. Typically, for this purpose, a hardcoat film, for example composed of polycarbonate, is insert-moulded (film insert moulding, IMD) with transparent or translucent layers of thermoplastic material, for example based on polycarbonate, meaning that at least a two-component structure is required. The light source used here is typically LED light, although it is also possible to use conventional incandescent lamps. In the switched-off state of the LED, such a moulding preferably has high-quality deep gloss, whereas soft light is apparent in the switched-on state of the LED. Corresponding components are also printed according to the application in order to allow only particular regions, for instance logos or figures, to appear through an illumination.

Since the films have to be inserted virtually perfectly into the respective mould, there will always be rejects in the conventional production process.

It would be desirable to simplify the known process for production of corresponding components and corresponding components.

The problem addressed was therefore that of finding a corresponding solution.

The problem has surprisingly been solved by the combination of specific colourants with carbon black and a scattering additive in polycarbonate.

The invention therefore provides an LED lighting element comprising a moulding and one or more LEDs arranged in the LED illumination unit such that they shine through the moulding, wherein the moulding has been produced from a translucent moulding compound comprising a) at least 90% by weight of aromatic polycarbonate,
b) a colourant mixture composed of colourants other than component c and component e, comprising at least two colourants in a total amount of up to 0.1% by weight,
c) 0.00001% by weight to 0.05% by weight of carbon black,
d) 0.00001% to 2% by weight of at least one scattering additive from the group consisting of acrylate-based scattering additives and/or silicone-based scattering additives,
e) optionally up to 1.0% by weight of at least one white pigment,
f) optionally one or more further additives.

"Moulding compound" is understood to mean the finished mixture of polymer and additives.

"Translucent" in the context of the present invention refers to moulding compounds having transmission in the range from 380 to 780 nm (measured at a thickness of 4 mm according to ISO 13468-2:2006 (D65, 10°)) of less than 85% and greater than 5%, further preferably of less than 80% and greater than 20%, and preferably a haze, determined according to ASTM D1003:2013 at a layer thickness of 4 mm, of greater than 5.0% and not more than 80.0%.

That the moulding "has been produced from" is not supposed to mean that the moulding cannot include any further layers, such as scratch-resistant layers.

According to the invention, "up to" also includes the respective limit, including the range of rounding. "Up to 0.1%" thus includes not only 0.1% and the values below but also, for example, 0.12% by weight. "Up to" is thus used as a synonym for "to".

The moulding compounds used in accordance with the invention enable, for LED lighting units, the production of mouldings for day/night design applications with a deep gloss look in day design in a relatively simple method. Rather than having to bond two components in the conventional manner, the same effect can be achieved with a single material that has been brought into the desired shape by means of injection moulding for example. The LED lighting units according to the invention have black mouldings with a deep gloss effect which, as a result of illumination with LED light, especially that from an RGB-LED, have a significantly different appearance to that in unilluminated form.

The one or more LEDs, especially one or more RGB-LEDs, has/have thus been arranged in the lighting element such that it/they shine(s) through the moulding in the switched-on state. "Shines through" means here that the LED is arranged behind the moulding, such that some of the light is emitted by the moulding made of translucent material.

The figures in % by weight are each based on the overall composition which forms the moulding compound.

Component a)

The polymer on which the moulding compound from which the moulding of the LED lighting element has been produced is based is aromatic polycarbonate.

Aromatic polycarbonates in the context of the invention are all known aromatic polycarbonates. This includes homopolycarbonates and copolycarbonates. Where reference is made merely to "polycarbonate" anywhere in the context of the present invention, what are meant are especially aromatic polycarbonates.

A portion of up to 80 mol %, preferably of 20 mol % to 50 mol %, of the carbonate groups in the polycarbonates used in accordance with the invention may be replaced by aromatic dicarboxylic ester groups. Polycarbonates of this kind that incorporate both acid radicals from the carbonic acid and acid radicals from aromatic dicarboxylic acids into the molecular chain are referred to as aromatic polyester carbonates. In the context of the present invention, they are likewise covered by the umbrella term of thermoplastic aromatic polycarbonates.

"Polycarbonate-based" here and elsewhere in the context of the present description of the invention means that the overall composition described contains at least 90% by weight, preferably at least 92% by weight, more preferably at least 95% by weight, most preferably at least 98% by weight, of polycarbonate.

Polycarbonate suitable in accordance with the invention preferably have average molecular weights $\overline{M}_w$ of 10 000 to 50 000 g/mol, further preferably of 14 000 to 40.000 g/mol and more preferably of 16 000 to 32 000 g/mol, determined by gel permeation chromatography according to DIN 55672-1:2007-08, calibrated against bisphenol A polycarbonate standards using dichloromethane as eluent. Calibration is effected with linear polycarbonates (formed from bisphenol A and phosgene) of known molar mass distribution from PSS Polymer Standards Service GmbH, Deutschland according to method 2301-0257502-09D (from 2009 in German language) from Currenta GmbH & Co. OHG, Leverkusen. The eluent is dichloromethane. Column combination of crosslinked styrene-divinylbenzene resins. Diameter of the analytical columns: 7.5 mm; length: 300 mm. Particle sizes of the column material: 3 μm to 20 μm. Concentration of the solutions: 0.2% by weight. Flow rate: 1.0 ml/min, temperature of solutions: 30° C. Detection using a refractive index (RI) detector.

The polycarbonates are preferably produced by the interfacial process or the melt transesterification process, which have been described many times in the literature.

With regard to the interfacial process, reference is made by way of example to H. Schnell, Chemistry and Physics of Polycarbonates, Polymer Reviews, vol. 9, Interscience Publishers, New York 1964 p. 33 ff., to Polymer Reviews, vol. 10, "Condensation Polymers by Interfacial and Solution Methods", Paul W. Morgan, Interscience Publishers, New York 1965, ch. VIII, p. 325, to Drs. U. Grigo, K. Kircher and P. R-Müller "Polycarbonate" [Polycarbonates] in Becker/Braun, Kunststoff-Handbuch [Polymer Handbook], volume 3/1, Polycarbonate, Polyacetale, Polyester, Celluloseester [Polycarbonates, Polyacetals, Polyesters, Cellulose Esters], Carl Hanser Publishers, Munich, Vienna, 1992, p. 118-145, and to EP 0 517 044 A1.

The melt transesterification process is described, for example, in the "Encyclopedia of Polymer Science", Vol. 10 (1969), Chemistry and Physics of Polycarbonates, Polymer Reviews, H. Schnell, Vol. 9, John Wiley and Sons, Inc. (1964), and in patent specifications DE 10 31 512 A and U.S. Pat. No. 6,228,973 BI.

The polycarbonates are preferably prepared by reactions of dihydroxyaryl compounds, especially bisphenol compounds, with carbonic acid compounds, especially phosgene, or of diphenyl carbonate or dimethyl carbonate in the melt transesterification process.

Dihydroxyaryl compounds suitable for the preparation of polycarbonates are those of the formula (1)

$$HO\text{—}Z\text{—}OH \qquad (1),$$

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (1) is a radical of the formula (2)

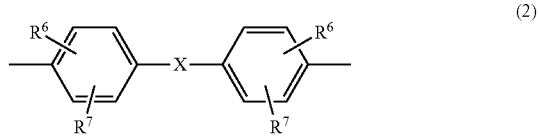

in which $R^6$ and $R^7$ are independently H, $C_1$- to $C_{18}$-alkyl, $C_1$- to $C_{18}$-alkoxy, halogen such as Cl or Br or in each case optionally substituted aryl or aralkyl, preferably H or $C_1$- to $C_{12}$-alkyl, more preferably H or $C_1$- to $C_8$-alkyl and most preferably H or methyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else is $C_6$- to $Cl_2$-arylene which may optionally be fused to aromatic rings containing further heteroatoms.

Preferably, X is a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of the formula (3)

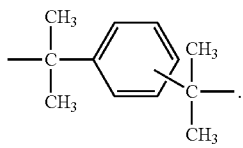

(3)

Examples of dihydroxyaryl compounds are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

Examples of dihydroxyaryl compounds suitable for the preparation of the homopolycarbonates and copolycarbonates to be used in accordance with the invention include hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl) diisopropylbenzenes, phthalimides derived from isatin or phenolphthalein derivatives, and the alkylated, ring-alkylated and ring-halogenated compounds thereof. Preparation of copolycarbonates can also be accomplished using Si-containing telechelics, so as to obtain what are called Si copolycarbonates.

Preferred dihydroxyaryl compounds are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC), and also the bisphenols (I) to (III)

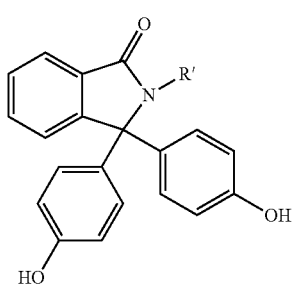

(I)

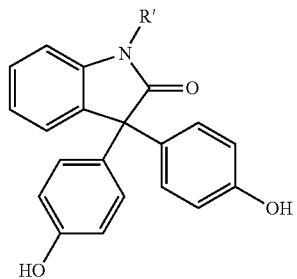

(II)

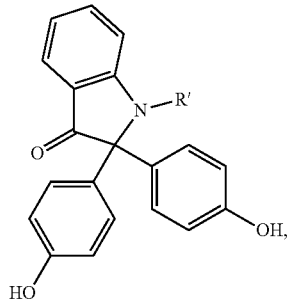

(III)

in which R' in each case is $C_1$- to $C_4$-alkyl, aralkyl or aryl, preferably methyl or phenyl, most preferably methyl.

Particularly preferred dihydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), dimethyl bisphenol A, and also the diphenols of the formulae (I), (II) and (III).

These and further suitable dihydroxyaryl compounds are described, for example, in U.S. Pat. No. 2,999,835 A, 3 148 172 A, 2 991 273 A, 3 271 367 A, 4 982 014 A and 2 999 846 A, in German published specifications 1 570 703 A, 2 063 050 A, 2 036 052 A, 2 211 956 A and 3 832 396 A, in French patent 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff.".

In the case of the homopolycarbonates, only one dihydroxyaryl compound is used; in the case of copolycarbonates, two or more dihydroxyaryl compounds are used.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane, and also homo- or copolycarbonates derived from bisphenol A and the diphenols of formulae (I), (II) and/or (III)

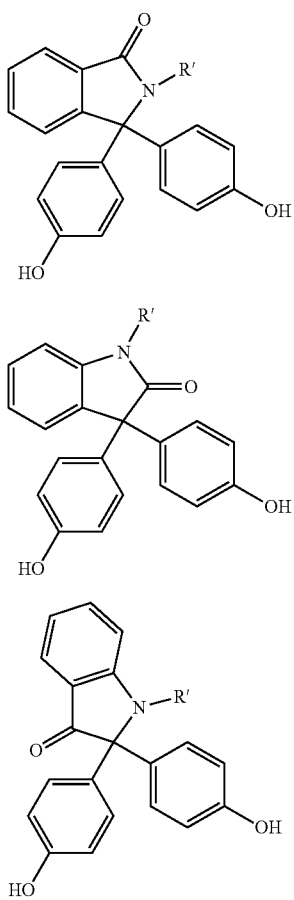

in which R' in each case is $C_1$- to $C_4$-alkyl, aralkyl or aryl, preferably methyl or phenyl, most preferably methyl.

Very particular preference is given to the homopolycarbonate based on bisphenol A.

The dihydroxyaryl compounds used, like all the other chemicals and auxiliaries added to the synthesis, may be contaminated with the impurities originating from their own synthesis, handling and storage. However, it is desirable to work with the purest possible raw materials.

The polycarbonates may be linear or branched. It is also possible to use mixtures of branched and unbranched polycarbonates.

Suitable branching agents for the production of branched polycarbonates are known from the literature and described for example in the patent documents U.S. Pat. No. 4,185,009 B and DE 25 00 092 A1 (3,3-bis(4-hydroxyaryloxindoles), see whole document in each case), DE 42 40 313 A1 (see page 3, lines 33 to 55), DE 19 943 642 A1 (see page 5, lines 25 to 34) and U.S. Pat. No. 5,367,044 B and in literature cited therein.

The amount of any branching agents to be used is preferably 0.05 mol % to 2.00 mol %, based on moles of dihydroxyaryl compounds used in each case.

The branching agents may be either initially charged together with the dihydroxyaryl compounds and the chain terminators in the aqueous alkaline phase or added dissolved in an organic solvent before the phosgenation. In the case of the transesterification process, the branching agents are used together with the dihydroxyaryl compounds.

Furthermore, the polycarbonates used may also be intrinsically branched, in which case no branching agent is added in the course of polycarbonate preparation. An example of intrinsic branching is that of so-called Fries structures, as described for melt polycarbonates in EP 1 506 249 A1.

In addition, it is possible to use chain terminators in the polycarbonate preparation. Suitable chain terminators that may be used in the production of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by tert-butyl. Particularly preferred chain terminators are phenol, cumylphenol and/or p-tert-butylphenol.

The amount of chain terminator to be used is preferably 0.1 to 5 mol %, based on moles of dihydroxyaryl compounds used in each case. The chain terminators can be added before, during or after the reaction with a carbonic acid derivative.

Component b)

The moulding compounds from which the mouldings of the LED lighting elements have been produced comprise at least two colourants, preferably selected from the group consisting of colourants based on anthraquinone, anthrapyridone, perinone, methine and quinoline. "Based on" in this specific context means that the base structure of the colourants of component b) have the compound specified in each case as a base structure, which can additionally be seen. These base structures preferably have substituents.

Colourants are suitable in principle are colourants of the following structures (4a) to (24):

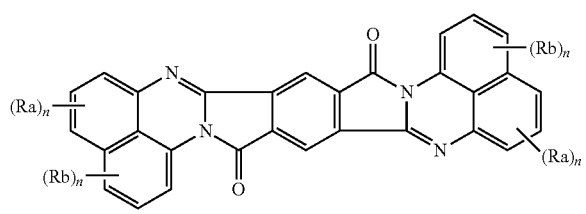

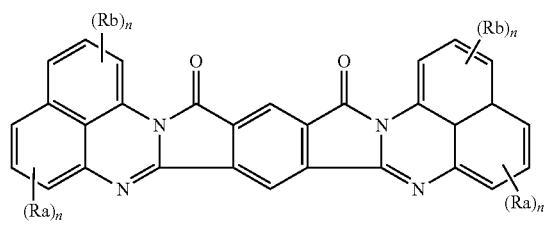

where
Ra and Rb are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
n independently of the respective R is a natural number from 0 to 3, where the radical is hydrogen when n=0; even further preferably, Ra and/or Rb are Cl and are in o- and/or p positions to the carbon atom which bear the amine functionalities, for example diortho-chloronaphthalino, diortho-, mono-para-chlornaphthalino, and monoorthonaphthalino. In addition, in a preferred embodiment, Ra and Rb are each a tert-butyl radical which is preferably in the meta position to the carbon atoms bearing the nitrogen functionalities.

In a particularly preferred embodiment, n=0 in all rings, and so all Ra and Rb=H.

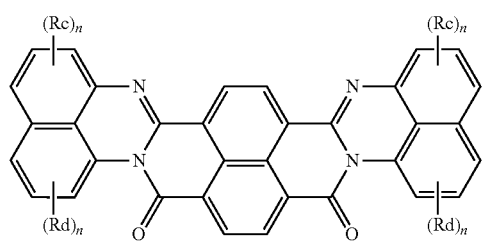
(5a)

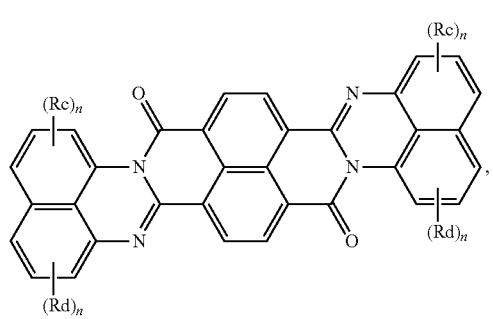
(5b)

where

Rc and Rd are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl, n independently of the respective R is a natural number from 0 to 3, where the radical is hydrogen when n=0; even further preferably, Rc and/or Rd are Cl and are in o- and/or p positions to the carbon atom which bear the amine functionalities, for example diortho-chloronaphthalino, diortho-, mono-para-chlornaphthalino, and monoorthonaphthalino. In addition, in a preferred embodiment, Rc and Rd are each a tert-butyl radical which is preferably in the meta position to the carbon atoms bearing the nitrogen functionalities.

In a particularly preferred embodiment, n=0 in all rings, and so all Rc and Rd=H.

The structures (4a) and (4b), and (5a) and (5b) are isomers of one another. The respective isomers may each be used alone or in a mixture. In a particular embodiment, a 1:1 isomer mixture (based on the respective amount of isomer in the isomer mixture in % by weight) of (4a) and (4b) or (5a) and (5b) is used.

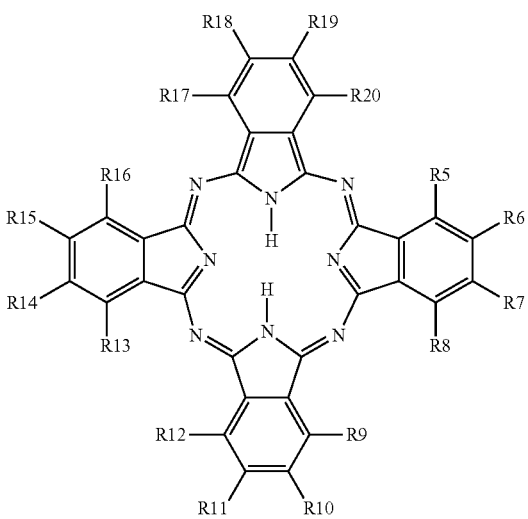
(6a)

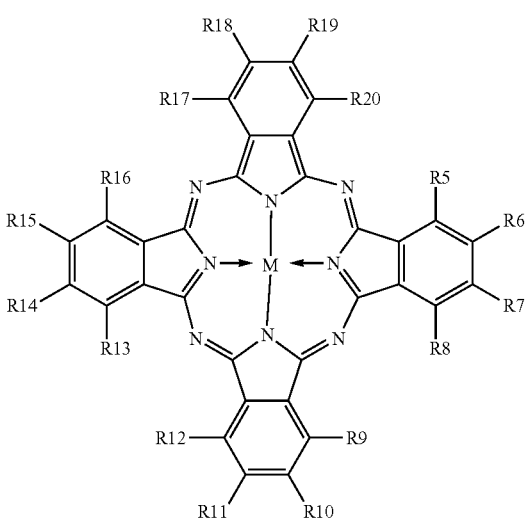
(6b)

The R(5-20) radicals are each independently hydrogen, methyl, ethyl, propyl, isopropyl, butyl, isobutyl, tert-butyl, pentyl, neopentyl, hexyl, thexyl, fluorine, chlorine, bromine, sulfone, CN.

Preferably, R(5-20) is the same in all positions. Further preferably, R(5-20) is H in all positions. In an alternative embodiment, R(5-20) is Cl in all positions.

M is preferably aluminium (with R=H: aluminium phthalocyanine, CAS: 14154-42-8), nickel (with R=H: nickel phthalocyanine, CAS: 14055-02-8), cobalt (with R=H: cobalt phthalocyanine, CAS: 3317-67-7), iron (with R=H: iron phthalocyanine, CAS: 132-16-1), zinc (with R=H: zinc phthalocyanine, CAS: 14320-04-08), copper (with R=H: copper phthalocyanine, CAS: 147-14-8; with R=H and Cl: polychloro copper phthalocyanine, CAS: 1328-53-6; with R=Cl: hexadecachlorophthalocyanine, CAS: 28888-81-5; with R=Br: hexadecabromophthalocyanine, CAS: 28746-04-5), manganese (with R=H: manganese phthalocyanine, CAS: 14325-24-7) and/or magnesium.

The combination of M=Cu and R=H for all positions is especially preferred. For instance, a compound of the structure (6b) with M=Cu and R(5-20)=H is obtainable as Heliogen® Blue K 6911D or Heliogen® Blue K 7104 KW from BASF AG, Ludwigshafen.

Compounds of the structure (6a) are available, for example, as Heliogen® Blue L 7460 from BASF AG, Ludwigshafen.

(7)

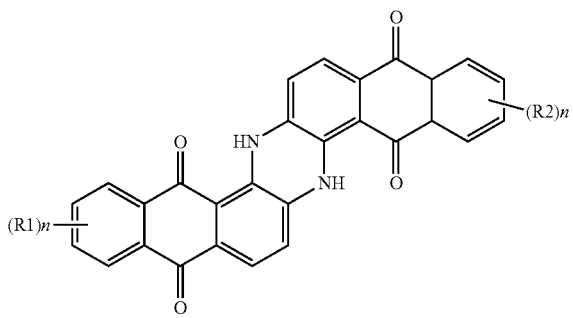

where
- R1 and R2 are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
- n is a natural number from 0 to 4.

In a particularly preferred embodiment, n=0 in all rings, and so all R1 and R2=H.

Colourants of this structure (7) are commercially available under the Paliogen Blue series from BASF AG.

In the case of use of colourants of the structure (7), preference is given especially to the pigments having a bulk volume (determined according to DIN ISO 787-11) of 2 l/kg-10 l/kg, preferably 3 l/kg-8 l/kg, a specific surface area (determined according to DIN 66132:1975-07) of 5 m²/g-60 m²/g, preferably 10 m²/g-55 m²/g, and a pH (determined according to DIN ISO 787-9:1995-04) of 4-9, (8)

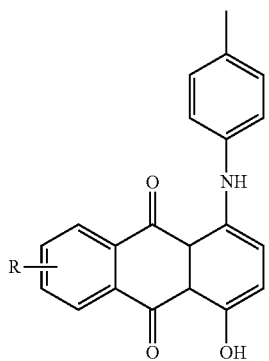

where
R is selected from the group consisting of H and p-methylphenylamine radical; preferably R=H.

Colourants of this kind are available, for example, under the Macrolex® Violet B trade name from Lanxess AG.

(9)

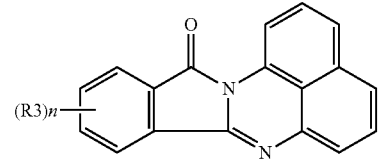

where R3 is preferably halogen, especially preferably Cl, where, more preferably n=4. Preference is further given to an embodiment with n=0, such that R3=H.

Colourants of this kind are available, for example, as Macrolex® Orange 3G or Macrolex® Rot EG from Lanxess AG.

(10)

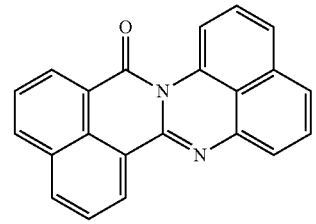

Colourants of this kind are available, for example, under the Macrolex® Red E2G brand name from Lanxess AG, CAS Number 89106-94-5.

(11)

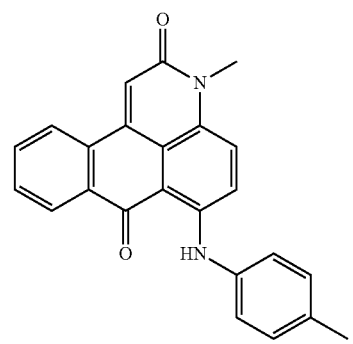

This colourant with Color Index 68210 is available under the "Macrolex® Red 5B" or else "Solvent Red 52" name.

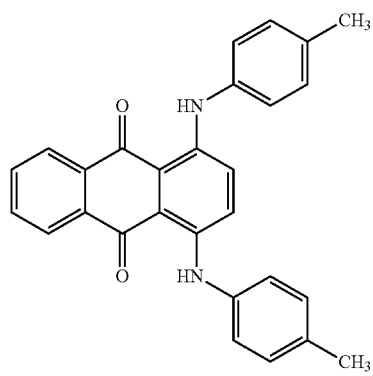

(12)

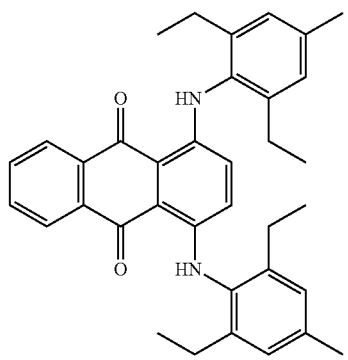

(15)

The colourant of the formula (12) is known by the Macrolex Green 5B name from Lanxess Deutschland GmbH, Color Index number 61565, CAS Number: 128-90-3, and is an anthraquinone dye.

This colourant with Color Index 615290 is commercially available under the "Keyplast Blue E", "Macrolex® Blue RR" or "Solvent Blue 97" name.

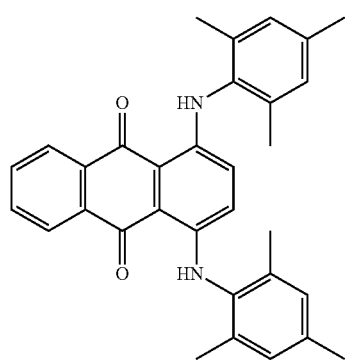

(13)

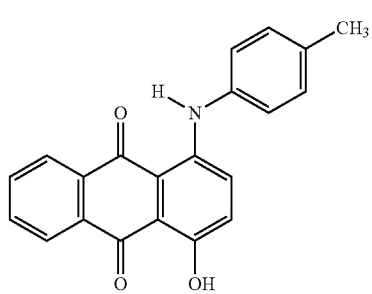

(16)

This colourant is available under the "Keyplast Blue KR" or "Solvent Blue 104" name, CAS Number 116-75-6, Color Index-Number: 61568.

This colourant with CAS Number 81-48-1 is available under the "Macrolex Violet B" or "Solvent Violet 13" name, Color Index 60725, from Lanxess AG.

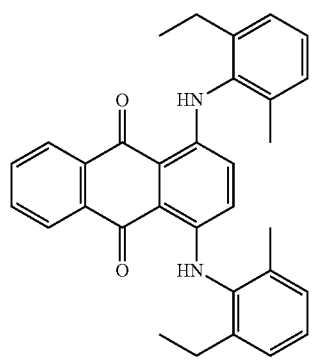

(14)

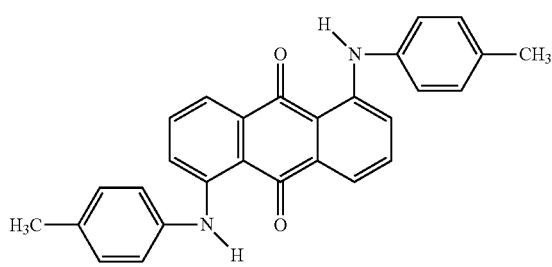

(17)

This colourant is available under the "Macrolex Blue 3R Gran" name, CAS Number 41611-76-1.

This colourant is commercially available under the "Macrolex® Violet 3R" or "Solvent Violet 36" name.

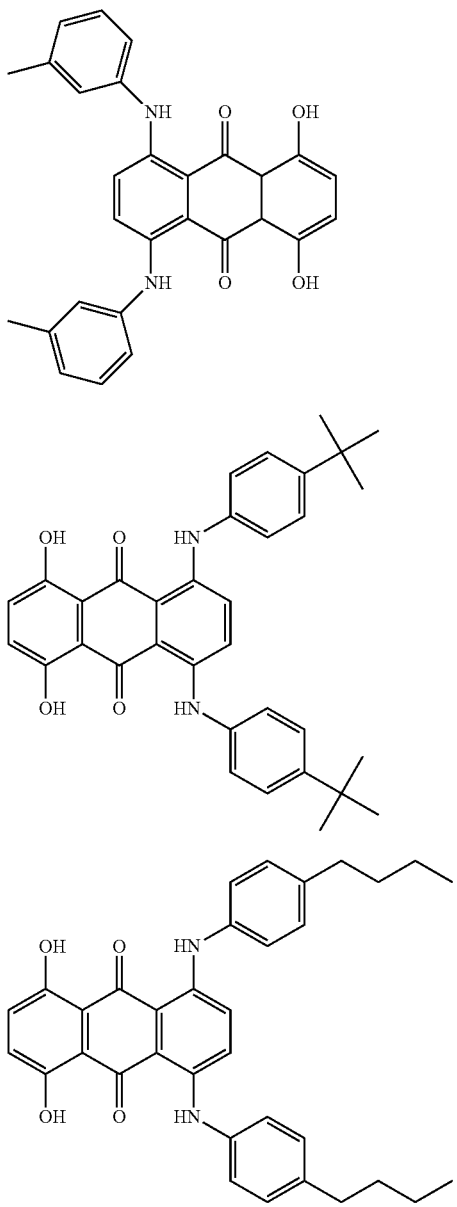

(18)

(19)

(20)

Colourants of this kind are available, for example, under the "Macrolex Green G" trade name from Lanxess AG.

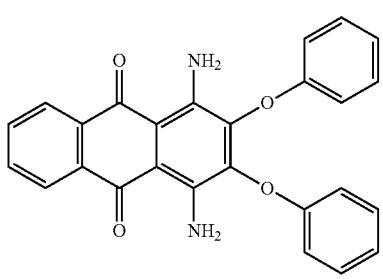

(21)

This colourant is available under the "Macrolex RedViolet R" name, CAS Number 6408-72-6.

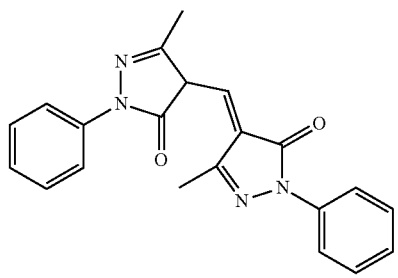

(22)

This colourant is available under the "Macrolex Yellow 3G" or "Solvent Yellow 93" name with Color Index 48160.

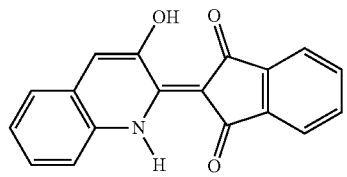

(23)

This colourant is commercially available under the "Macrolex Yellow G" or "Solvent Yellow 1 14" name with Color Index 47020.

The amount of colourants of component b) in total in the moulding compounds is up to 0.1% by weight, preferably up to 0.05% by weight, further preferably 0.0005% by weight to 0.02% by weight.

The moulding compounds preferably comprise a colourant based on anthraquinone and a further colourant based on anthraquinone or anthrapyridone. Further preferably, the moulding compounds do not comprise any further colourants beyond that.

The moulding compounds further preferably comprise at least one colourant of the following formula (24):

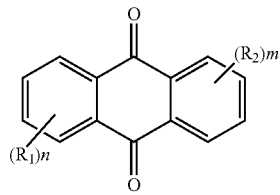

(24)

where
R₁ is a substituted or unsubstituted phenylamine radical, preferably an unsubstituted phenylamine radical,
R₂ is a substituted or unsubstituted phenylamine radical, preferably a p-methylphenylamine radical or a 2,6-diethyl-4-methylphenylamine radical,
n is a natural number from 0 to 4, preferably 0 or 1, and m is a natural number from 0 to 4, preferably 1 or 2.
If n=0, there is no substituent on the respective radical that would replace H.
More preferably, at least one colourant of the formula (15) is present.
Even more preferably, a colourant of the formula (17) is present as a further colourant.

Even more preferably, a colourant of the formula (1) is alternatively present as a further colourant.

Most preferably, aside from the colourants (15) and (17) or (15) and (11) and optionally (13), no further colourant is present in the moulding compounds according to the invention.

Alternatively preferred colourants which represent one of the at least two colourants of component b) are
the colourant of the structure (23)
the colourant of the structure (22),
colourants of the formula (9), especially commercially available under the "Macrolex Red EG" or "Solvent Red 135" name with Color Index 564120;
the colourant of the structure (16),
the colourant of the structure (12).

Colourants of component b in any case do not comprise any colourants of components c and e.

Component c)

Component c is carbon black.

The moulding compounds used in accordance with the invention contain 0.00001% to 0.05% by weight, preferably 0.0003% to 0.020% by weight, further preferably 0.0004% to 0.015% by weight of carbon black, most preferably 0.00045% to 0.014% by weight of carbon black.

The carbon black is preferably finely dispersed in the organic polymer matrix and is further preferably in nanoscale form, especially a nanoscale colouring carbon black. Suitable carbon blacks have an average particle size, determined by scanning electron microscopy, preferably less than 100 nm, further preferably less than 75 mm, even further preferably less than 50 nm and more preferably less than 40 nm, the average particle size preferably being greater than 0.5 nm, further preferably greater than 1 nm and more preferably greater than 5 nm, most preferably from 10 to 30 nm, exceptionally preferably from 10 to 20 nm.

Commercially available carbon blacks that are suitable in the context of the invention are obtainable in a multitude of trade names and forms, such as pellets or powders. For instance, suitable carbon blacks are available under the BLACK PEARLS® trade names, as wet-processed pellets under the ELFTEX®, REGAL® and CSX® names, and in a flaky form as MONARCH®, ELFTEX®, REGAL® and MOGUL®, all from Cabot Corporation. Especially preferred are carbon blacks that are traded under the BLACK PEARLS® trade name (CAS No. 1333-86-4).

In a particularly preferred embodiment, the carbon black types have particle sizes of 10 nm-30 nm, especially 10 to 20 mm, and have a specific surface area of preferably 35 $m^2$–138 $m^2$ per g ($m^2/g$), determined according to ISO 9277:2014-01 (BET method). The carbon black may be treated or untreated. For instance, the carbon black may have been treated with particular gases or with silica or organic substances, for example butyllithium. Such a treatment can achieve modification or functionalization of the surface. This can promote compatibility with the matrix used correspondingly. Especially preferred are carbon blacks that are traded under the BLACK PEARLS® trade name (CAS No. 1333-86-4).

Component d)

The scattering additive is used in the moulding compounds from which mouldings of the LED lighting elements are produced in amounts of 0.00001% by weight to 2% by weight, preferably 0.01% by weight to 1.0% by weight, further preferably 0.05% by weight to 0.50% by weight. The scattering additive may be a single scattering additive or else a mixture of two or more scattering additives. The scattering additive is selected from the group of the acrylate-based scattering additives and/or the silicone-based scattering additives. There may be one scattering additive from this group or alternatively a mixture. More preferably, the moulding compounds comprise acrylate-based scattering additive as scattering agent. Most preferably, in addition, no silicone-based scattering agent is present.

Scattering additives in the context of the invention are thus none of the white pigments mentioned as component e).

The scattering additives preferably have a high thermal stability to 300° C. in order not to be broken down at the processing temperatures of polycarbonate. In addition, the scattering additives should not have any functionalities that lead to perceptible degradation of the polymer chain. Preferably, the scattering additives should not lead to any degradation of the polymer chain of the polycarbonate at all.

Preferred acrylate-based scattering agents are polyalkylacrylates having preferably 1 to 8 carbon atoms in the alkyl group, further preferably having an average particle size (number average) of 0.5 μm to 80 μm, preferably 2 μm to 40 μm, especially 3 μm to 15 μm, especially 3 μm to 9 μm. Mixtures of alkyl acrylates may likewise be used (homo- or copolymers). Preferably, the acrylate-based scattering agents have been crosslinked. Suitable crosslinking agents are the crosslinking agents known for acrylates. Preferred crosslinking agents are glycol-based crosslinkers such as, in particular, ethylene glycol dimethacrylate.

Particularly preferred acrylate-based scattering additives are polymethylmethacrylate-containing scattering agents, for example polymeric particles of polymethylmethacrylate and polybutylacrylate having core-shell morphology, available, for example, as Paraloid® EXL 5136 or Paraloid® EXL 5137 from Rohm & Haas, or else partly or fully crosslinked spherical or non-spherical acrylate particles, for example those from the Techpolymer® MBX series from Sekisui Plastics, Techpolymer® MBX-S or MBX-8. Scattering additives having core-shell morphology are described, for example, in EP 0 634 445 B1 as "polymeric particle (b)".

The silicone-based scattering additives preferably have an average particle size (number-average) of 0.5 μm to 100 μm, preferably 0.5 μm to 20 μm, especially 1 μm to 6 μm, determined by means of laser scattering to ISO 13320:2009.

Silicone-based suitable scattering agents are silsesquioxanes, organic silicon compounds. A silsesquioxane used with preference has the general formula $[RSiO_{3/2}]_n$ with R=H, alkyl, aryl or alkoxy. Particular preference is given to polymethylsilsesquioxane. Commercially available suitable silsesquioxanes are, for example, products from the Tospearl® product group from Momentive, USA, Tospearl® TSR9000 or 120S or Ganzpearl Si-020 from Ganz Chemical Co., Ltd.

Component e)

The moulding compounds optionally contain up to 1.0% by weight of white pigment. The white pigment present in inventive moulding compounds is preferably zinc oxide, zinc sulfide, barium sulfate and/or titanium dioxide, further preferably titanium dioxide and/or barium sulfate; titanium dioxide is present with particular preference as white pigment. The white pigment may consist of one of these two components only or else comprise one or more other white pigments from this list or selected from the group of the white pigments in general.

If barium sulfate is present, the proportion in the overall composition is typically 0.1% to 1.0% by weight of barium sulfate.

If the white pigment comprises titanium dioxide, the amount of the white pigment is preferably 0.03% to 1.0% by weight, further preferably 0.03% to 0.5% by weight, more preferably to 0.1% by weight. Very particular preference is given here to 95% by weight of the white pigment, based on the total amount of white pigments, of titanium dioxide. Exceptionally preferably, titanium dioxide is the sole white pigment here.

Component f)

The moulding compounds may optionally comprise one or more further additives other than component b) to e), provided that these do not lead to loss of translucence. Typically 0% to 5% by weight, preferably 0.05% by weight to 3% by weight, further preferably 0.1% by weight to 1% by weight, of further additives are present. Here as elsewhere, unless stated otherwise, the percentages by weight are based on the respective overall composition.

Customary polymer additives as may be present as component fare described, for example, in EP-A 0 839 623, WO-A 96/15102, EP-A 0 500 496 or "Plastics Additives Handbook", Hans Zweifel, 5th Edition 2000, Hanser Verlag, Munich. Such further additives are, for example, demoulding agents, antioxidants, flame retardants, anti-dripping agents, thermal stabilizers, optical brighteners, UV absorbers and/or IR absorbers.

Further additives present with preference are solely one or more demoulding agents, UV absorbers and/or one or more thermal stabilizers.

Suitable thermal stabilizers are selected from the groups of the phosphates, phosphites, phosphonites and phosphines. Examples are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite (Irgafos® 168), diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo[d,g]-1,3,2-dioxaphosphocine, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, bis(2,6-di-tert-butyl-4-methylphenyl)pentaerythritol diphosphites (PEP-36), 5-butyl-5-ethyl-2-(2,4,6-tri-tert-butylphenoxy)-1,3,2-dioxaphosphirane, triphenylphosphine (TPP), trialkylphenylphosphine, bisdiphenylphosphinoethane or a trinaphthylphosphine. Especially preferred are triphenylphosphine (TPP), Irgafos® 168 (tris(2,4-di-tert-butylphenyl) phosphite) and tris(nonylphenyl) phosphite, PEP-36 (bis(2,6-di-tert-butyl-4-methylphenyl) pentaerythritol diphosphite) or mixtures thereof.

Phosphate stabilizers in the context of the present invention are, for example, phosphates of the formula (IV) or mixtures of these phosphates

(IV)

where R1 independently represents branched alkyl radicals and/or optionally substituted alkyl radicals, where the alkyl radical is preferably a $C_1$- to $C_{18}$-alkyl, further preferably a $C_1$- to $C_8$-alkyl radical. If a phosphate stabilizer is present, it is more preferably tri(2-ethylhexyl) phosphate (triisooctyl phosphate).

The aryl radical is preferably substituted by $C_1$- to $C_8$-alkyl, branched $C_1$- to $C_8$-alkyl, or cumyl, where the substituents may be the same or different, but preference is given to identical substituents. Preferably, the aryl radicals are substituted in positions 2 and 4 or 2, 4 and 6. Very particular preference is given to tert-butyl substituents in these positions.

Further preferably, all R1 are the same.

In addition, it is possible to use phenolic antioxidants, for example alkylated monophenols, alkylated thioalkylphenols, hydroquinones and alkylated hydroquinones. Preference is given to using Irganox® 1010 (pentaerythritol 3-(4-hydroxy-3,5-di-tert-butylphenyl)propionate; CAS: 6683-19-8) and/or Irganox 1076® (2,6-di-tert-butyl-4-(octadecanoxycarbonylethyl)phenol). Particular preference is given to using Irganox 1076® (2,6-di-tert-butyl-4-(octadecanoxycarbonylethyl)phenol).

In a specific embodiment of the present invention, the phosphine compounds according to the invention are used together with a phosphite or a phenolic antioxidant or a mixture of the two latter compounds.

In a particularly preferred embodiment, the stabilizer system consists of triphenylphosphine, a mixture of triphenylphosphine and a phenolic antioxidant such as Irganox® 1076 or Irganox® 1010, and/or a combination of phenolic antioxidant and phosphite, preferably of a mixture of Irganox® 1076 or Irganox® 1010 and Irgafos® 168 or PEP-36.

In a further preferred embodiment, the stabilizer system consists of a phosphine, a phosphite and a phenolic antioxidant, for example triphenylphosphine, Irganox® 1076 and Irgafos® 168.

Suitable demoulding agents are, for example, the esters or partial esters of mono- to hexahydric alcohols, especially of glycerol, of pentaerythritol or of Guerbet alcohols. Monohydric alcohols are, for example, stearyl alcohol, palmityl alcohol and Guerbet alcohols. An example of a dihydric alcohol is glycol; an example of a trihydric alcohol is glycerol; examples of tetrahydric alcohols are pentaerythritol and mesoerythritol; examples of pentahydric alcohols are arabitol, ribitol and xylitol; examples of hexahydric alcohols are mannitol, glycidol (sorbitol) and dulcitol.

The esters are preferably the monoesters, diesters, triesters, tetraesters, pentaesters and hexaesters or mixtures thereof, especially statistical mixtures of saturated aliphatic $C_{10}$ to $C_{36}$ monocarboxylic acids and optionally hydroxymonocarboxylic acids, preferably with saturated aliphatic $C_{14}$ to $C_{32}$ monocarboxylic acids and optionally hydroxymonocarboxylic acids.

The commercially available fatty acid esters, especially of pentaerythritol and/or glycerol, may contain <60% different partial esters as a result of the preparation.

Examples of saturated aliphatic monocarboxylic acids having 10 to 36 carbon atoms are capric acid, lauric acid, myristic acid, palmitic acid, stearic acid, hydroxystearic acid, arachic acid, behenic acid, lignoceric acid, cerotic acid and montanic acids. Particularly suitable demoulding agents as component f) of the composition according to the invention are, for example, pentaerythritol tetrastearate (PETS) or glycerol monostearate (GMS). In a specific embodiment of the invention, the overall composition comprises demoulding agents in a proportion of 0 ppm to 3000 ppm, preferably 100 ppm to 1000 ppm, and further preferably 150 ppm to 500 ppm, based on the mass of the overall composition.

The preferred UV stabilizers as component f) of the present invention are compounds having minimum transmittance below 400 nm and maximum transmittance above 400 nm. Such compounds and the preparation thereof are known from the literature and are described, for example, in EP-A 0 839 623, WO-A 96/15102 and EP-A 0 500 496. Ultraviolet absorbers particularly suitable for use in the composition according to the invention are benzotriazoles, triazines, benzophenones and/or arylated cyanoacrylates.

Very particularly suitable ultraviolet absorbers are hydroxybenzotriazoles such as 2-(3',5'-bis(1,1-dimethylbenzyl)-2'-hydroxyphenyl)benzotriazole (Tinuvin® 234, Ciba Spezialitätenchemie, Basle), 2-(2'-hydroxy-5'-(tert-octyl) phenyl)benzotriazole (Tinuvin® 329, Ciba Spezialitätenchemie, Basle), 2-(2'-hydroxy-3'-(2-butyl)-5'-(tert-butyl)phenyl)benzotriazole (Tinuvin® 350, Ciba Spezialitätenchemie, Basle), bis(3-(2H-benztriazolyl)-2-hydroxy-5-tert-octyl) methane, (Tinuvin® 360, Ciba Spezialitätenchemie, Basle), (2-(4,6-diphenyl-1,3,5-triazin-2-yl)-5-(hexyloxy)phenol (Tinuvin® 1577, Ciba Spezialitätenchemie, Basle), and the benzophenones 2,4-dihydroxybenzophenone (Chimasorb® 22, Ciba Spezialitätenchemie, Basle) and 2-hydroxy-4-(octyloxy)benzophenone (Chimassorb® 81, Ciba, Basle), 2-cyano-3,3-diphenyl-2-propenoic acid 2-ethylhexyl ester, 2,2-bis[[(2-cyano-1-oxo-3,3-diphenyl-2-propenyl)oxy] methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basle) or tetraethyl 2,2'-(1,4-phenylenedimethylidene)bismalonate (Hostavin® B-Cap, Clariant AG).

Exceptionally preferred UV stabilizers are, for example, Tinuvin® 360, Tinuvin® 350, Tinuvin® 329, Hostavin® B-CAP, more preferably TIN 329 and Hostavin® B-Cap.

It is also possible to use mixtures of these ultraviolet absorbers.

With regard to the amount of the ultraviolet absorber present in the composition, there are no particular restrictions, provided that the desired absorption of UV radiation and sufficient transparency of the shaped body produced from the composition are assured. In a specific embodiment of the invention, the composition comprises ultraviolet absorbers in an amount of 0 ppm to 6000 ppm, preferably 500 ppm to 5000 ppm, and further preferably 1000 ppm to 2000 ppm, based on the overall composition.

Anti-dripping agents are preferably fluorine-containing anti-dripping agents, especially polytetrafluoroethylene.

Translucent moulding compounds that are particularly preferred in accordance with the invention and from which a moulding of an LED lighting units according to the invention has been produced comprise
  a) at least 90% by weight, most preferably 95% by weight, of aromatic polycarbonate,
  b) a colourant mixture of colourants other than component c and e, comprising at least two colourants, where preferably one colourant is on anthraquinone-based colourant and the other colourant is likewise an anthraquinone-based colourant or an anthrapyridone-based colourant, especially a mixture of the colourants of the structures (15) and (11) or (15) and (17),
    in a total amount of up to 0.1% by weight of colourants of component b),
  c) 0.0003% to 0.020% by weight, especially 0.0004% to 0.0015% by weight, of carbon black, especially nanoscale carbon black, more preferably as the sole carbon black,
  d) 0.05% to 1.0% by weight, especially to 0.50% by weight, of at least one scattering additive from the group consisting of acrylate-based scattering additives and/or silicone-based scattering additives, where a silsesquioxane in particular is present as a scattering additive, which is most preferably the sole scattering additive of component d),
  e) optionally up to 1.0% by weight, preferably 0.03% to 1.0% by weight, of at least one white pigment, preferably comprising a white pigment from the group consisting of titanium dioxide and/or barium sulfate, especially 0.04% 0.08% by weight of titanium dioxide, exceptionally preferably as the sole white pigment,
  f) optionally one or more further additives, preferably selected from the group consisting of demoulding agents, antioxidants, flame retardants, anti-dripping agents, thermal stabilizers, optical brighteners, UV absorbers and/or IR absorbers.

If what is desired is that the mouldings formed from the moulding compounds have a black visual appearance with deep gloss effect, the moulding compounds preferably comprise
  a) at least 90% by weight, more preferably at least 95% by weight, most preferably up to 99.95% by weight, of aromatic polycarbonate,
  b) a colourant mixture of colourants other than component c and component e, comprising at least two colourants, at least one colourant being an anthraquinone-based colourant and the other colourant an anthrapyridone-based colourant,
    where the total amount of colourants of component b) is up to 0.1% by weight,
  c) 0.002% to 0.02% by weight of carbon black, where the carbon black present is especially nanoscale carbon black, most preferably a nanoscale colouring carbon black, exceptionally preferably as the sole carbon black.
  d) 0.05% to 1.0% by weight, especially to 0.5% by weight, of at least one scattering additive from the group consisting of acrylate-based scattering additives and/or silicone-based scattering additives,
  f) optionally one or more further additives selected from the group consisting of demoulding agents, antioxidants, flame retardants, anti-dripping agents, thermal stabilizers, UV absorbers and/or IR absorbers,
  and are more preferably free of white pigment.

If what is desired is that the mouldings formed from the moulding compounds have a grey visual appearance with deep gloss effect, the moulding compounds preferably comprise
  a) at least 90% by weight, most preferably 95% by weight, of aromatic polycarbonate,
  b) a colourant mixture composed of colourants other than component c and component e, comprising at least two colourants, the colourants being selected from the group consisting of colourants based on anthraquinone, anthrapyridone, perinone, methine and quinoline, where one colourant is preferably an anthraquinone-based colourant and the other colourant is likewise an anthraquinone-based colourant, where the total amount of colourants of component b) is up to 0.1% by weight,
c) 0.0003% to 0.020% by weight, especially 0.00045% to 0.001% by weight, of carbon black, especially nanoscale carbon black, more preferably as the sole carbon black,
d) 0.05% to 1.0% by weight, especially to 0.5% by weight, of at least one scattering additive from the group consisting of acrylate-based scattering additives and/or silicone-based scattering additives, where a silsesquioxane in particular is present as a scattering additive, which is most preferably the sole scattering additive of component d),
e) 0.03% to 1.0% by weight of at least one white pigment, especially 0.04% by weight to 0.08% by weight, where titanium dioxide is preferably present as white pigment,
f) optionally one or more further additives, especially selected from the group consisting of demoulding agents, antioxidants, flame retardants, anti-dripping agents, thermal stabilizers, optical brighteners, UV absorbers and/or IR absorbers.

More preferably in each case, the silsesquioxane here is polymethylsilsesquioxane. The three above-described particularly preferred configurations most preferably do not comprise any further components.

Particularly preferred translucent moulding compounds comprise
a) 95% by weight to 99.95% by weight of aromatic polycarbonate,
b) a colourant mixture composed of colourants other than component c and component e, comprising at least two colourants selected from the group consisting of colourants based on anthraquinone, anthrapyridone, perinone, methine and quinoline, in a total amount of up to 0.05% by weight, preferably 0.0005% by weight of 0.02% by weight,
c) 0.00001% by weight to 0.02% by weight, preferably 0.0002% by weight to 0.015% by weight, of carbon black,
d) 0.00001% to 2% by weight, preferably 0.05% to 0.6% by weight, especially to 0.5% by weight, of at least one scattering additive from the group consisting of acrylate-based scattering additives and/or silicone-based scattering additives,
e) optionally up to 1.0% by weight of at least one white pigment, preferably 0.02% to 0.2% by weight, more preferably 0.03% to 0.1% by weight, of at least one white pigment, most preferably comprising titanium dioxide, exceptionally preferably consisting of titanium dioxide,
f) optionally one or more further additives.

Most preferably, the moulding compounds from which the moulding of the LED lighting element has been produced does not comprise any further components, where group f of the further additives consists of the group of the demoulding agents, antioxidants, flame retardants, UV absorbers, IR absorbers, anti-dripping agents, optical brighteners and/or thermal stabilizers.

Moulding compounds and ultimately mouldings are produced proceeding from the components described by standard methods of incorporation, by combining, mixing and homogenizing, the homogenization in particular preferably taking place in the melt by application of shear forces. To this end, the aromatic polycarbonate and any further components of the polycarbonate moulding compound are mixed, extruded and pelletized in the melt under customary conditions in customary melt mixing assemblies, for example in single-screw or multi-screw extruders or in kneaders. The additives may be metered in either separately as granules/pellets via metering balances or side feed devices or else metered in at a suitable location into the solids conveying region of the extruder or into the polymer melt at elevated temperature as a melt by means of metering pumps. The masterbatches in the form of granules or pellets may also be combined with other particulate compounds to afford a premixture and then supplied together into the solids conveying region of the extruder or into the polymer melt in the extruder via metering hoppers or side feed devices. The compounding assembly is, for example, a twin-screw extruder, more preferably a twin-screw extruder having corotating screws, where the twin-screw extruder preferably has a screw length/diameter ratio of 20 to 44, more preferably of 28 to 40. Such a twin-screw extruder comprises a melting zone and a mixing zone or a combined melting and mixing zone and optionally a degassing zone where an absolute pressure p of preferably not more than 800 mbar, more preferably not more than 500 mbar, more preferably not more than 200 mbar, is established. The average residence time of the mixture composition in the extruder is preferably limited to not more than 120 seconds, more preferably not more than 80 seconds, more preferably not more than 60 seconds. In a preferred embodiment, the temperature of the melt of the polymer/of the polymer alloy at the extruder outlet is 200° C. to 400° C. In addition to extrusion, the moulding compounds may be converted to corresponding mouldings by hot press moulding, spinning, blow moulding, thermoforming or injection moulding. For the production of the mouldings according to the invention, preference is given here to injection moulding or injection-compression moulding, especially injection moulding.

Injection moulding processes are well known to those skilled in the art and are described, for example, in "Handbuch Spritzgießen" [Injection Moulding Handbook], Friedrich Johannnaber/Walter Michaeli, Munich; Vienna: Hanser, 2001, ISBN 3-446-15632-1 or "Anleitung zum Bau von Spritzgießwerkzeugen" [Introduction to the Construction of Injection Moulds], Menges/Michaeli/Mohren, Munich; Vienna: Hanser, 1999, ISBN 3-446-21258-2.

Injection moulding here encompasses all injection moulding processes including multicomponent injection moulding and injection-compression moulding processes.

Injection-compression moulding processes differ from conventional injection moulding processes in that the injection and/or solidification procedure includes mould plate movement. In the known injection moulding process, the mould plates are already opened slightly before the injection procedure to compensate for the shrinkage occurring during subsequent solidification and to reduce the required injection pressure. A pre-enlarged cavity is therefore already present at the beginning of the injection procedure. Flash faces of the mould ensure that the pre-enlarged cavity is still sufficiently leakproof even when the mould plates have been somewhat opened. The plastics composition is injected into this pre-enlarged cavity and is simultaneously/subsequently compressed as the mould moves towards the closed position. Particularly in the production of large surface area and thin-walled mouldings having long flow paths, the more complex injection-compression moulding technique is preferred or in some cases essential. A reduction of the injection pressures required for large mouldings is achieved only in this way. Furthermore, stresses/warpage in the injection-moulded part arising from high injection pressures can be avoided by injection-compression moulding.

The mouldings may either be in the form of sheets or have a three-dimensional surface, i.e. a shape other than that of a sheet, a sheet being understood to mean a body in which the three pairs of opposite sides are plane-parallel or at least nearly plane-parallel to one another.

The mouldings preferably have a thickness of 0.5 mm to 4 mm, preferably of 1 mm to 3 mm, more preferably of 1.2 mm to 2 mm. The thickness of the moulding is understood here to mean the distance between the front and back faces of the moulding in its respective use, i.e. the thickness of the moulding is based on the distance between the two faces of the moulding in the plane on which the viewer looks in the respective use. If the moulding does not have the same thickness at all points, which may be the case especially in the case of mouldings having a three-dimensional surface, thickness of the moulding takes account of the thickest point.

The mouldings have preferably been coated with a scratch-resistant lacquer (hardcoat) as part of a protective layer. This is preferably a polysiloxane lacquer produced by the sol-gel process. The protective layer particularly preferably also contains at least one UV absorber. The protective layer has a high abrasion and scratch resistance and thus fulfils in particular the function of a scratch-resistant coating.

Commercially obtainable systems include for example AS4000, SHC5020 and AS4700 from Momentive Performance Materials. Such systems are described for example in U.S. Pat. No. 5,041,313 A, DE 3,1213,85 A1, U.S. Pat. No. 5,391,795 A and WO 2008/109072 A1. The synthesis of these materials is typically effected by condensation of alkoxy- and/or alkylalkoxysilanes under acid or base catalysis. Nanoparticles may optionally be incorporated. Preferred solvents are alcohols such as butanol, isopropanol, methanol, ethanol and mixtures thereof.

Various methods for applying a scratch-resistant coating to plastics articles are known. The scratch-resistant coatings may be applied, for example, by immersion processes, spin coating, spraying processes or flow coating, preferably by immersion or flow processes. Curing may be effected thermally or by UV irradiation. The scratch-resistant coating may be applied for example directly or after preparation of the substrate surface with a primer. A scratch-resistant coating may also be applied via plasma-assisted polymerization processes, for example via an $SiO_2$ plasma. Antifogging or antireflection coatings may likewise be produced via plasma processes. It is also possible to use certain injection moulding processes, for example overmoulding of surface-treated films, to apply a scratch-resistant coating on the resulting moulded article. Various additives, for example UV absorbers, derived for example from triazoles or triazines may be present in the scratch-resistant layer.

The protective layer may be single- or multilayer systems and hence also a combination of two or more layers. More particularly, the protective layer may consist of the layers topcoat layer a' and primer layer a", with the primer layer arranged between the topcoat layer and substrate layer b.

Polysiloxane-based scratch-resistant coatings are preferably applied via immersion or flow methods. Curing is effected at temperatures of 50° C.-140° C.

Preference is given to using a UV absorber-containing primer in order to improve the adhesion of the scratch-resistant lacquer on the substrate layer. The primer may comprise further stabilizers, for example HALS systems (stabilizers based on sterically hindered amines), adhesion promoters and/or flow enhancers. The respective resin forming the base material of the primer layer may be selected from a multiplicity of materials and is described for example in Ullmann's Encyclopedia of Industrial Chemistry, $5^{th}$ Edition, Vol. A18, pp. 368-426, VCH, Weinheim 1991. Polyacrylates, polyurethanes, phenol-based systems, melamine-based systems, epoxy systems and alkyd systems or mixtures of these systems may be employed. The resin is usually dissolved in suitable solvents—often in alcohols. Depending on the selected resin the curing may be effected at room temperature or at elevated temperatures. Preference is given to using temperatures between 50° C. and 140° C.—often after a large part of the solvent has been removed over a short period at room temperature. Commercially obtainable primer systems include for example SHP470, SHP470-FT2050 and SHP401 from Momentive Performance Materials. Such coatings are described for example in U.S. Pat. No. 6,350,512 BI, U.S. Pat. No. 5,869,185 A, EP 1308084 A1 and WO 2006/108520 A1.

In a preferred embodiment which achieves particularly good weathering stability the protective layer comprises
a polysiloxane-based scratch-resistant coating comprising
i. at least one UV absorber from the group of benzophenones, resorcinols, 2-(2-hydroxyphenyl)benzotriazoles, hydroxyphenyl-s-triazines, 2-cyanoacrylates, oxalanilides
and/or a UV inhibitor from the group of sterically hindered amines (HALS), in particular based on 2,2,6,6-tetramethylpiperidine or derivatives thereof;
ii. at least one combination of an organomodified silane with a silica sol. The organomodified silane is, for example, a methyltrialkoxy- or dimethyldialkoxysilane;
and optionally, in a further preferred embodiment, additionally a primer layer (layer a") which is disposed on the substrate layer composed of the moulding compound according to the invention and acts as an adhesion promoter between the polysiloxane-based scratch-resistant coating on the substrate layer, comprising at least one UV absorber from the group of the benzophenones, the resorcinols, 2-(2-hydroxyphenyl)benzotriazoles, hydroxyphenyl-s-triazines, 2-cyanoacrylates, oxalanilides and/or sterically hindered amines (HALS), especially based on 2,2,6,6-tetramethylpiperidine and derivatives thereof, where the thickness of the primer layer is 0.3 µm to 8 µm, preferably 1.1 µm to 4.0 µm.

Most preferably, the protective layer does not comprise any further layers.

"Derivatives" are understood in accordance with the invention to mean those compounds having a molecular structure having a different atom or a different atomic group in place of a hydrogen atom or a functional group or in which one or more atoms/atomic groups have been removed. The parent compound thus still remains recognizable.

The polysiloxanes layer preferably comprises a silicon compounds of the formula $R_nSiX_{4-n}$ and/or partial condensates thereof, where the R radicals are the same or different and are a linear or branched, saturated or mono- or polyunsaturated or aromatic hydrocarbyl radical, the X radicals are the same or different and a hydrolysable groups are hydroxyl groups, preferably halogen, especially chlorine or bromine, alkoxy groups, alkylcarbonyl groups or acyloxy groups, and n is 0, 1, 2 or 3, preferably 1 or 2, most preferably 1. R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbon atoms. The alkyl/alkenyl radicals more preferably have up to 12, yet more preferably up to 8, carbon atoms. More preferably, all radicals are methyl and/or phenyl. More preferably, X is an alkoxy group, most preferably a $C_1$- to $C_4$-alkoxy group, for example a methoxy group or an ethoxy group.

The silicon compounds $R_nSiX_{4-n}$ are hydrolysable and condensable via the X radicals. An inorganic network comprising Si—O—Si units is constructed via these hydrolytically condensable groups. In contrast to the X radicals, the R radicals are stable to hydrolysis under the typical condensation conditions.

When using the abovementioned siloxane systems, dry layer thicknesses of 3 µm-20 µm are preferred, further preferably 5 µm-15 µm, especially preferably 6 µm-12 µm. "Dry layer thickness" here means the layer thickness of the lacquer after application and subsequent evaporation of the solvent and subsequent thermal or UV curing.

Rather than primer/scratch resistant coating combinations, it is also possible to use one-component hybrid systems that are either thermally curable or UV-curable for the multilayer articles according to the invention.

These are described, for example, in EP 0570165 A2 or WO 2008/071363 A2 or DE 2804283 A. Commercially available hybrid systems are obtainable, for example, under the PHC 587, PHC 587C names as thermally curable lacquers and under the UVHC 3000 and UVHC 5000 names as UV-curable lacquers from Momentive Performance Materials. Further commercially available UV-curing lacquer systems that are suitable in accordance with the invention are UVT 610 and UVT 820 from Redspot.

In a particularly preferred process for producing the mouldings according to the invention, the protective layer is applied by means of the flow-coating process since it results in coated parts having a high optical quality.

The flow-coating process can be effected manually with a hose or suitable coating head, or automatically in a continuous run by means of flow-coating robots and optionally slot dies.

Further possible methods of application are immersion, blade coating, rolling, spraying or spin coating. The component parts may here be coated either hanging or stored in an appropriate goods carrier.

For larger and/or 3D component parts—i.e. component parts having a three-dimensional surface which thus also have a geometry departing from that of a sheet—the part to be coated is suspended in or placed upon a suitable goods carrier.

For small parts the coating may also be performed by hand. Here, the liquid primer or lacquer solution to be layered for forming the protective layer e is poured over the sheet in the longitudinal direction starting from the upper edge of the small part while simultaneously the starting point of the lacquer on the sheet is passed from left to right over the sheet width. The lacquered sheets are aired and cured according to the respective manufacturer instructions while hanging vertically by a clamp.

The LED lighting elements can especially be used where a day/night design is required, i.e. especially for interior applications, especially in buildings and motor vehicles, more preferably in automobiles. The preferably black or else grey mouldings, without LED light shining through them from the reverse side, show deep gloss. If LED light shines through the mouldings proceeding from an LED light source on the reverse side of the moulding, according to the thickness of the moulding and the type of the LED light, what can be seen is instead a bright glow in the respective colour of the LED light or a corresponding the coloured surface. When a white LED shines through a sheet thickness of 1 mm, for example, what can be seen is bright, comparatively white LED light, whereas the surface has apparent green colour at a thickness of 2 mm. When RGB-LED light, i.e. red, green and/or blue light, shines through a sheet of thickness 1 mm, it looks as if light is shining through a red-, green- or blue-coloured translucent sheet, even though the sheet in the non-illuminated state shows a black or grey deep gloss effect. In the case of a sheet of thickness 2 mm too, when an RGB-LED shines through, nothing more of the black or grey colour can be seen; instead, it looks as if sheets coloured in the corresponding colours are present, and it is barely apparent during the day whether a light source is used for illumination or simply just a different colour of the sheet is present. In this respect too, however, there is a day/night design.

In a preferred embodiment which is combinable with the other features described for the material and the LED lighting unit, the moulding has been printed on the reverse side, i.e. on the side from which LED light shines through the moulding, for instance by means of screen printing. This allows graphic elements—logos, inscriptions, image representations set—to be integrated into the day/night design. More preferably, the part which is to light up when illuminated by means of LED light is unprinted. The element to be represented is correspondingly visualized by a negative print.

For example, the inscription "Covestro" can be represented by printing the reverse side of the moulding completely with colour which is opaque, or not significantly transparent, to the respective LED light apart from the letters. The LED light bus passes through the moulding only at the point of the letters, such that the inscription lights up when the illumination by the LED lighting unit is switched on. This region which is printed on the reverse side thus has a visually similar appearance in night design to that of the day design.

By printing of the mouldings with logos, patterns etc., it is thus possible to apply regions to the mouldings through which LED light cannot shine.

"LED light" in the context of the present invention is preferably understood to mean light having radiation characteristics where more than 70% of the intensity released within the range from 100 nm to 3000 nm is in the visible range (in the context of the present invention, the visible range is defined as the wavelength range from 360 nm to 780 nm). More particularly, less than 5% of the intensity is in the region of <360 nm. Considering the range between 360 nm and 500 nm, the LED lighting the context of the present invention preferably has a dominant wavelength (local maximum) between 360 nm and 480 nm, further preferably between 400 nm and 480 nm and especially preferably between 430 nm and 470 nm (including the limits in each case).

This dominant wavelength, especially in the case of LED modules that emit light with a white colour impression, need not mean the dominant emission (=highest intensity) over the entire visible spectrum.

In the context of the present invention, "LED light" preferably has a local maximum in the range between 360 nm and 480 nm, which has a narrow emission breadth having a half-height width of not more than 60 nm, further preferably of not more than 45 nm, even further preferably of max. 30 nm, particular preference being given to monochromatic light.

In an alternative embodiment, the LED light preferably has a local maximum (in the range between 360 nm and 500 nm) of 400 nm to 405 nm inclusive. Such emission characteristics are achieved inter alia by the use of semiconductors or lasers as a light source. Semiconductor technology is frequently used nowadays, for example in LEDs (light-emitting diodes), organic LEDs (OLEDs) and electroluminescent films.

EXAMPLES

Materials for Production of the Test Specimens a1: linear aromatic polycarbonate based on bisphenol A from Covestro Deutschland AG with an MVR of 19 cm³/(0 min) (determined according to ISO 1133-1:2012-03 at 300° C. with load 1.2 kg).

b1: Macrolex® Blue RR, colourant of structure (15) from Lanxess Deutschland GmbH, C. I. (Color Index) 615290.

b2: Macrolex® Red 5B, colourant of structure (11) from Lanxess Deutschland GmbH, C. I. 68210.

b3: Macrolex® Violet 3R, colourant of structure (17) from Lanxess Deutschland GmbH, Solvent Violet 36.

c: nanoscale carbon black (particle size about 17 nm), Black Pearls® 800 (CAS No. 1333-86-4) from Cabot Corp.

d1: scattering additive, Ganzpearl SI-020, polymethylsilsesquioxane from Ganz Chemical Co., Ltd.

d2: scattering additive, MBX-8 from Sekisui Plastics. Cross-linked polymethylmethacrylate of spherical geometry having an average particle diameter of 8 μm.

e: Kronos 2230 titanium dioxide from Kronos Worldwide, Inc.

f: thermal stabilizer.

Production of the Test Specimens

Compounding was effected on a KrausMaffei Berstorff ZE 25 twin-screw extruder at a barrel temperature of 260° C. or a melt temperature of 270° C. and at a speed of 100 rpm at a throughput of 10 kg/h with the amounts of components specified in the examples.

The pellets were subsequently dried under reduced pressure at 120° C. for 3 hours and then injection-moulded using an Arburg 370 injection-moulding machine at a melt temperature of 300° C. and a mould temperature of 90° C. to give specimen plaques of dimensions 50 mm×75 mm in different thicknesses (1 to 4 mm).

layer of a colour that was not transparent (significantly transparent) the respective LED light in partial regions on the reverse side lit up only in the unprinted partial regions as a result of the LED lighting incident from the rear.

The invention claimed is:

1. A LED lighting element comprising a moulding and one or more LEDs arranged in the LED lighting element such that they shine through the moulding, wherein the moulding has been produced from a translucent moulding compound consisting of
   a) 95% by weight to 99.95% by weight of aromatic polycarbonate,
   b) 0.0005% by weight of 0.02% by weight of a colourant mixture composed of colourants other than component c and component e, comprising at least two colourants selected from the group consisting of colourants based on anthraquinone, anthrapyridone, perinone, methine and quinoline,
   c) 0.00001% by weight to 0.02% by weight of carbon black, wherein the carbon black has a particle size of 10 to 30 nm;
   d) 0.05% to 0.6% by weight of at least one scattering additive selected from the group consisting of PMMA containing acrylate based scattering additives and silsesquioxane;
   e) 0.03% to 0.1% by weight of at least one white pigment, wherein the white pigment is titanium dioxide;
   f) optionally one or more further additives other than component b to component e., selected from the group consisting of demoulding agents, antioxidants, flame retardants, UV absorbers, IR absorbers, anti-dripping agents, optical brighteners, thermal stabilizers.

2. LED lighting element according to claim 1, wherein the colourants are selected from the group consisting of colourants based on anthraquinone, and anthrapyridone.

3. LED lighting element according to claim 1, wherein one colourant is a colourant based on anthraquinone and the other colourant is another colourant based on anthraquinone or a colourant based on anthrapyridone.

4. LED lighting element according to claim 1, wherein the moulding compound contains from 0.0002% to 0.015% by weight of carbon black.

TABLE 1

| | | Ex. 1 (inventive) | Ex. 2 (inventive) | Ex. 3 (inventive) | Ex. 4 (inventive) | Ex. 5 (inventive) | Ex. 6 (inventive) |
|---|---|---|---|---|---|---|---|
| | | | | Compositions | | | |
| a1 | % by wt. | 99.93455 | 99.36891 | 99.32891 | 99.61885 | 99.80345 | 98.919883 |
| b1 | % by wt. | 0.0024 | 0.0004 | 0.0004 | 0.013 | 0.007 | 0.000057 |
| b2 | % by wt. | 0.00075 | | | 0.00415 | 0.00225 | |
| b3 | % by wt. | | 0.00024 | 0.00024 | | | 0.000060 |
| c | % by wt. | 0.0023 | 0.00045 | 0.00045 | 0.014 | 0.0073 | |
| d1 | % by wt. | 0.060 | 0.49 | 0.49 | 0.35 | 0.18 | |
| d2 | % by wt. | | | | | | 0.98 |
| e | % by wt. | | 0.04 | 0.08 | | | |
| f | % by wt. | | 0.1 | 0.1 | | | 0.1 |

The specimen plaques in different thickness were illuminated with RGB-LED light from the reverse side to produce a night design. Whereas there was a dark deep gloss effect in the day design, the light and its colour were clearly apparent on illumination by means of LED light from the reverse side. Specimen plaques which, as well as the injection-moulded moulding compound, also had a printed colour 5. LED lighting element according to claim 1, wherein the LED is an RGB-LED and/or the LEDs are RGB-LEDs.

6. LED lighting element according to claim 1, wherein the moulding has been printed on the side on which the LED(s) is/are disposed.

7. LED lighting element according to claim 1, wherein the moulding has a thickness of 0.5 mm to 4 mm.

8. A LED lighting element comprising a moulding and one or more LEDs arranged in the LED lighting element such that they shine through the moulding, wherein the moulding has been produced from a translucent moulding compound consisting of
   a) 95% by weight to 99.95% by weight of aromatic polycarbonate;
   b) 0.0005% by weight of 0.02% by weight of a colourant mixture composed of colourants other than component c and component e, comprising at least two colourants selected from the group consisting of colourants based on anthraquinone, anthrapyridone, perinone, methine and quinoline;
   c) 0.00001%0.002% by weight to 0.02% by weight of carbon black, wherein the carbon black has a particle size of 10 to 30 nm;
   d) 0.05% to 0.6% by weight of at least one scattering additive from the group consisting of PMMA containing acrylate-based scattering additives and silsesquioxane;
   f) optionally one or more further additives other than component b to e, selected from the group consisting of demoulding agents, antioxidants, flame retardants, UV absorbers, IR absorbers, anti-dripping agents, optical brighteners and/or thermal stabilizers, and wherein the moulding compound is free of white pigment.

* * * * *